(12) United States Patent
Kheyfets et al.

(10) Patent No.: US 11,489,806 B2
(45) Date of Patent: Nov. 1, 2022

(54) SYSTEMS AND METHODS FOR SORTING UNREAD MESSAGES IN A GROUP-BASED COMMUNICATION PLATFORM

(71) Applicant: Slack Technologies, LLC, San Francisco, CA (US)

(72) Inventors: Phillip Kheyfets, Brooklyn, NY (US); Sufian Rhazi, Brooklyn, NY (US); Jonathan Russell, Brooklyn, NY (US); James Barnes, San Francisco, CA (US); Rosaleen Nguyen, Brooklyn, NY (US); Zachary Sultan, Berkeley, CA (US)

(73) Assignee: Salesforce, inc., San Francisco, CA (US)

( * ) Notice: Subject to any disclaimer, the term of this patent is extended or adjusted under 35 U.S.C. 154(b) by 0 days.

(21) Appl. No.: 17/133,452

(22) Filed: Dec. 23, 2020

(65) Prior Publication Data

US 2022/0200944 A1 Jun. 23, 2022

(51) Int. Cl.
*G06F 3/0481* (2022.01)
*H04L 51/42* (2022.01)

(52) U.S. Cl.
CPC ............ *H04L 51/42* (2022.05); *G06F 3/0481* (2013.01)

(58) Field of Classification Search
CPC ...................... H04L 51/26; H04L 51/22; G06F 2203/04803; G06F 3/0481; H04M 1/7243; H04M 1/2746
See application file for complete search history.

(56) References Cited

U.S. PATENT DOCUMENTS

| | | | |
|---|---|---|---|
| 2006/0218233 A1* | 9/2006 | Greve | H04L 51/12 709/206 |
| 2014/0280616 A1* | 9/2014 | Ramanathan | G06Q 10/107 709/206 |
| 2018/0287982 A1 | 10/2018 | Draeger et al. | |
| 2018/0367495 A1* | 12/2018 | Kim | H04L 51/32 |
| 2019/0200177 A1* | 6/2019 | Greene | H04L 51/22 |
| 2020/0396191 A1* | 12/2020 | Yang | H04L 51/16 |

OTHER PUBLICATIONS

Haifeng Shen, Integrating Topic-centric Thread-based Organized Chat into Web-based Enterprise Instant Messengers, Nov. 1, 2010, IEEE Computer Society, pp. 442-447 (Year: 2010).*

Maryam Samiei et al., EZMail: Using Information Visualization Techniques to Help Manage Email, Jan. 1, 2004, IEEE Computer Society, pp. 1-6 (Year: 2004).*

(Continued)

*Primary Examiner* — Tam T Tran
(74) *Attorney, Agent, or Firm* — Holland & Hart LLP

(57) ABSTRACT

A method includes receiving a request to display sets of unread messages associated with a plurality of communication channels of a communication platform, wherein each set of unread messages is associated with a respective communication channel of the plurality of communication channels; receiving a selection to sort the sets of unread messages according to a user-defined sorting scheme for ordering display of the plurality of communication channels in the communication platform; and displaying the sets of unread messages sorted according to the user-defined sorting scheme.

15 Claims, 11 Drawing Sheets

(56) References Cited

OTHER PUBLICATIONS

"Die, Email, Die! A Flickr Cofounder Aims to Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 1:15 PM) 2 pages.
"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.
Adrienne LaFrance,"The Triumph of Email", Atlantic Online, Lexisnexis, www.advance.lexis.com/api/permalink/32d7ddd9-d4c1-4a73-86f7-08ab5842fde6/?context=1000516, (dated Jan. 6, 2016) 5 pages.
David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.
Ernie Smith, "Picking Up the Slack", Tedium, [online][retrieved May 9, 2019]. Retrieved from the Internet: www.tedium.co/2017/10/17/irc-vs-slack-chat-history/. (dated Oct. 17, 2017) 13 pages.
Internet Relay Chat, Wikipedia, [online][retrieved May 30, 2019]. Retrieved from the Internet: www.wikipedia.org/wiki/Internet_Relay_Chat. (dated May 28, 2019) 20 pages.
Jonathan Vanian, "Why these startups think chat apps are the next big thing in workplace collaboration", Gigaom, Lexisnexis, www.advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, www.advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.
Mike Isaac, "Slack, a Start-Up With an App to Foster Business Collaboration, is Valued at $1.1 Billion", The New York Times Blogs (BITS), Lexisnexis, www.advance.lexis.com/api/permalink/3eb84b34-a8f9-4d7d-9573-89d9598a4963/?context=1000516. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.
Rebecca Walberg, "Email biggest office waste of time: survey", National Post, At FP10, Lexisnexis, www.advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.
The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

SYSTEMS AND METHODS FOR SORTING UNREAD MESSAGES IN A GROUP-BASED COMMUNICATION PLATFORM

FIELD OF THE DISCLOSURE

The present disclosure relates generally to computer user interfaces, and more specifically to systems and methods for sorting unread messages in a communication system.

BACKGROUND OF THE DISCLOSURE

A communication platform (e.g., a messaging platform or an email platform) may allow a user to view all unread messages so that the user does not have to scroll through all messages to find those that the user has not read. Communication platforms may provide different pre-defined sorting schemes for unread messages, such as for arranging the unread messages by date or alphabetically by one or more fields. In some cases, a communication platform may organize messages into different message groups. For example, an email platform may enable a user to group messages into different folders and a messaging platform may provide different messaging groups. When displaying unread messages from different message groups according to pre-defined sorting schemes, it may be difficult for a user to discern which unread message comes from which message group.

SUMMARY OF THE DISCLOSURE

According to various embodiments, a group-based communication platform enables a user to display all unread messages for a plurality of communication channels and sort the unread messages according to a user-defined sorting scheme for the plurality of communication channels. Thus, the user's preferences with respect to organization of the channels is reflected in the display of the user's unread messages. According to various embodiments, the user can group communication channels into sections and can order the sections as desired, and unread messages can be displayed according to the order of the sections and the order of the channels within each section. In some embodiments, a user can choose to display unread messages for a selected subset of the sections and the unread messages for the selected subset of the sections are displayed according to the user-defined sorting of the channels of the selected subset.

In some embodiments, a computer-implemented method is executed, the method comprising: receiving a request to display sets of unread messages associated with a plurality of communication channels of a communication platform, wherein each set of unread messages is associated with a respective communication channel of the plurality of communication channels; receiving a selection to sort the sets of unread messages according to a user-defined sorting scheme for ordering display of the plurality of communication channels in the communication platform; and displaying the sets of unread messages sorted according to the user-defined sorting scheme.

In some embodiments of the method, the plurality of communication channels are organized into a plurality of sections, the user-defined sorting scheme comprises a user-defined order of the plurality of sections, and the sets of unread messages are displayed according to the user-defined order of the plurality of sections such that sets of unread messages for communication channels of a first section of the plurality of sections are displayed above sets of unread messages for communication channels of a second section of the plurality of sections.

In some embodiments of the method, a selection to display sets of unread messages for a selected section is received, and the sets of unread messages for the selected section sorted are displayed according to the user-defined sorting scheme for the selected section.

In some embodiments of the method, displaying the sets of unread messages comprises displaying communication channel identifiers and grouping each set of unread messages with a corresponding communication channel identifier.

In some embodiments of the method, communication channel identifiers associated with communication channels that do not have unread messages are not displayed in the display of the sets of unread messages.

In some embodiments of the method, unread messages associated with a communication channel that has been muted are not included in the display of the sets of unread messages.

In some embodiments of the method, the selection to sort the sets of unread messages according to a user-defined sorting scheme is made via a menu that comprises a plurality of sorting schemes.

In some embodiments, a group-based communication system comprising one or more processors, memory, and one or more programs stored in the memory and configured to be executed by the one or more processors is provided, the one or more programs including instructions for: receiving a request to display sets of unread messages associated with a plurality of communication channels of a communication platform, wherein each set of unread messages is associated with a respective communication channel of the plurality of communication channels; receiving a selection to sort the sets of unread messages according to a user-defined sorting scheme for ordering display of the plurality of communication channels in the communication platform; and displaying the sets of unread messages sorted according to the user-defined sorting scheme.

In some embodiments of the system, the plurality of communication channels are organized into a plurality of sections, the user-defined sorting scheme comprises a user-defined order of the plurality of sections, and the sets of unread messages are displayed according to the user-defined order of the plurality of sections such that sets of unread messages for communication channels of a first section of the plurality of sections are displayed above sets of unread messages for communication channels of a second section of the plurality of sections.

In some embodiments of the system, a selection to display sets of unread messages for a selected section is received, and the sets of unread messages for the selected section sorted are displayed according to the user-defined sorting scheme for the selected section.

In some embodiments of the system, displaying the sets of unread messages comprises displaying communication channel identifiers and grouping each set of unread messages with a corresponding communication channel identifier.

In some embodiments of the system, communication channel identifiers associated with communication channels that do not have unread messages are not displayed in the display of the sets of unread messages.

In some embodiments of the system, unread messages associated with a communication channel that has been muted are not included in the display of the sets of unread messages.

In some embodiments of the system, the selection to sort the sets of unread messages according to a user-defined sorting scheme is made via a menu that comprises a plurality of sorting schemes.

In some embodiments, a non-transitory computer-readable storage medium storing one or more programs is provided, the one or more programs comprising instructions, which when executed by one or more processors of a computing system, cause the computing system to: receive a request to display sets of unread messages associated with a plurality of communication channels of a communication platform, wherein each set of unread messages is associated with a respective communication channel of the plurality of communication channels; receive a selection to sort the sets of unread messages according to a user-defined sorting scheme for ordering display of the plurality of communication channels in the communication platform; and display the sets of unread messages sorted according to the user-defined sorting scheme.

BRIEF DESCRIPTION OF THE DRAWINGS

The invention will now be described, by way of example only, with reference to the accompanying drawings, in which.

DETAILED DESCRIPTION OF THE DISCLOSURE

Figure 1:
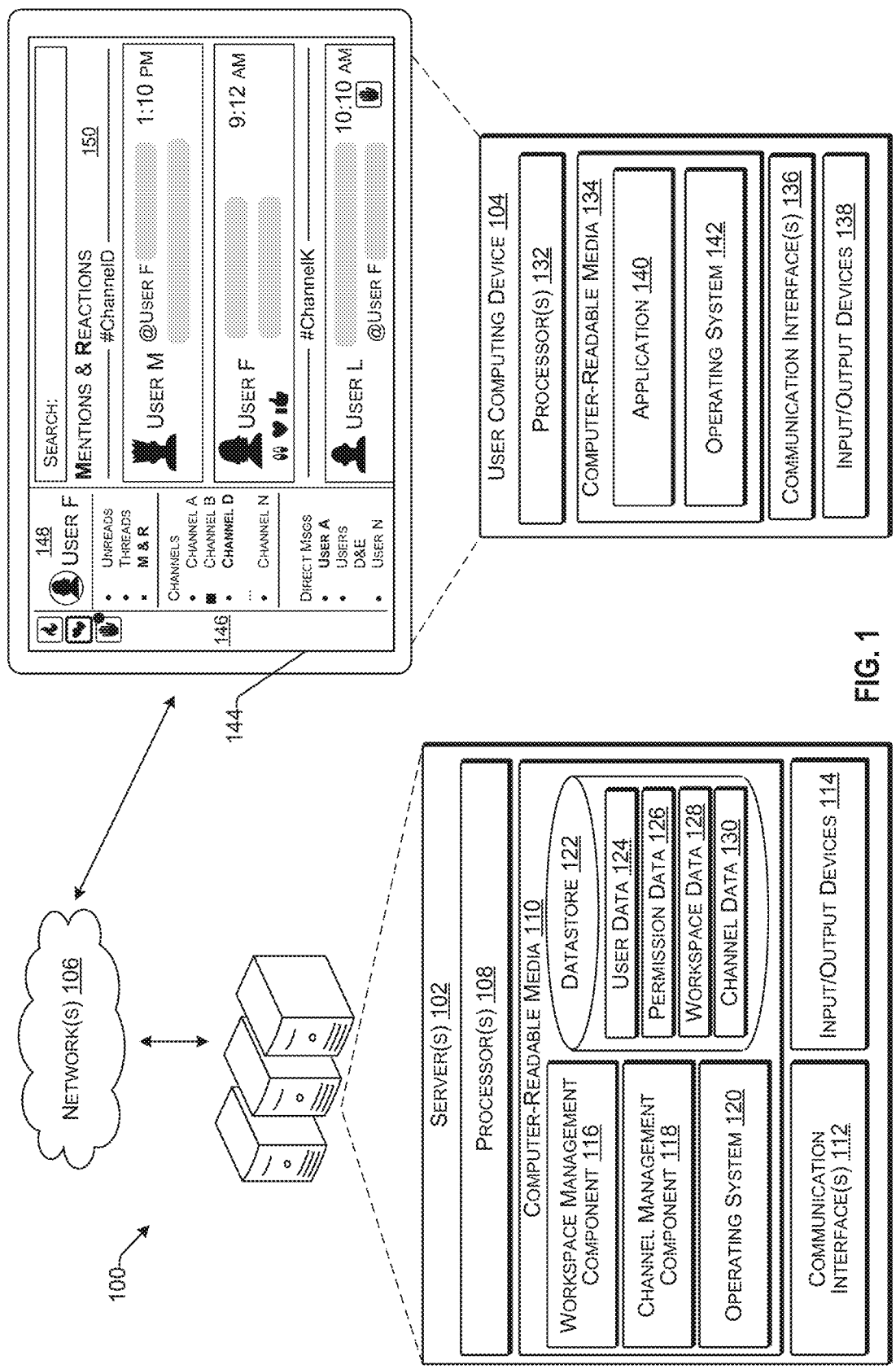
FIG. 1 illustrates an example environment for displaying messages within a group-based communication platform, according to some embodiments.

According to various embodiments, systems and methods described herein enable a user to sort unread messages in a group-based communication platform according to a user-defined sorting scheme. A user may define an order by which channels of the group-based communication platform are sorted and displayed in the communication platform. Upon defining the order, the user may then be able to sort unread messages in the order in which the channels were sorted (e.g., so that all unread messages associated with a first channel sorted above a second channel are displayed above unread messages associated with the second channel). In some embodiments, a user may be able to filter which unread messages are displayed by selecting to view unread messages associated with a subset of communication channels, such as a set of channels that have been grouped together in the user-defined sorting scheme. The sorting and/or filtering features allow a user to quickly and easily view and/or respond to important unread messages in the communication platform without needing to scroll through unread messages that may be less important. Moreover, by sorting unread messages according to a user-defined sorting scheme, the user may be able to more intuitively navigate through unread messages since they are arranged according to the user's own organization scheme.

In some embodiments, a plurality of channels associated with the group-based communication platform are displayed in a sidebar display region of an interface associated with the communication platform. The user can arrange the plurality of channels according to the user's preferences. For example, the user may group channels into different sections, may order sections as desired, and/or may reorder channels. In some embodiments, a user may select to view all unread messages associated with at least a portion of the communication channels, and in response to the user selection, all unread messages may be displayed in a message display region of the interface. In some embodiments, a user may select to display the unread messages according to the user-defined sorting scheme used to order the channels in the sidebar display region. In response to the user selection to display unread messages according to the user-defined sorting scheme, the unread messages may be reordered according to the user-defined sorting scheme such that unread messages associated with a first channel that is displayed above a second channel in the channel display region are displayed above unread messages associated with the second channel. In some embodiments, channels may be grouped into sections and unread message associated with channels of a first section that is displayed above a second section in the channel display region are displayed above unread messages associated with channels of the second section.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a workspace management component 116, a channel management component 118, an operating system 120, and a datastore 122.

In at least one example, the workspace management component 116 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116 can manage workspace membership. That is, the workspace management component 116 can receive requests to associate users with individual workspaces and the workspace management component 116 can associate user accounts associated with such users with group identifiers associated with the individual workspaces. For example, responsive to receiving a request to add a user to a workspace, the workspace management component 116 can associate a user account of the user with a group identifier of the workspace. The workspace management component 116 can disassociate user accounts and group identifiers, for example, when a user is removed from a workspace.

In at least one example, the workspace management component 116 can manage cross-workspace data integration, as described herein. For example, the workspace management component 116 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 116 can detect updates to data associated with a workspace and can integrate such updated data into user interface(s) presented via user computing device(s) of user(s) associated with the workspace. Similarly, the workspace management component 116 can facilitate cross-workspace operations. For example, the workspace management component 116 can facilitate messages between workspaces, searches between or across multiple workspaces, and the like. Additional details of operations that can be performed by the workspace management component 116 are described below.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the workspace management component 116 to manage the generation, presentation, and/or updating of user interfaces. Additional details of operations that can be performed by the channel management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace (s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116, the channel management component 118, and the application 140, techniques described herein can be performed by any other component, or combination of components, which can be associated with the server(s) 102, the user computing device 104, or a combination thereof.

Figure 2:
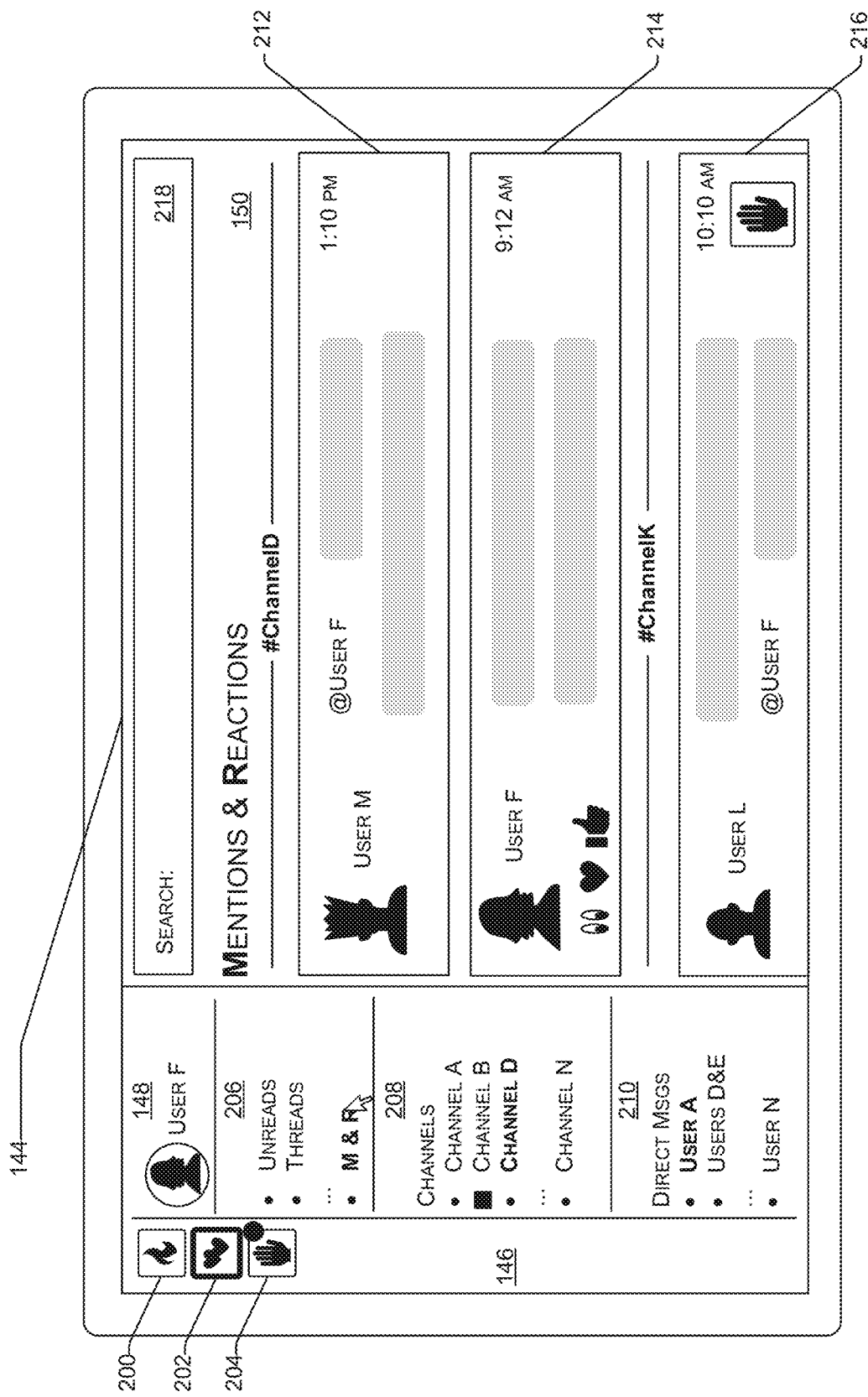
FIG. 2 illustrates aspects of a user interface, according to some embodiments.

FIG. 2 illustrates additional details associated with the user interface 144 that presents data associated with multiple workspaces, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user (e.g., User F) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user (e.g., User F) can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, type of message, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user (e.g., User F), can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user (e.g., User F) in a message, represented by the indicator 212 (e.g., a user interface element, object, etc.), which is associated with a communication channel (e.g., #ChannelD). The user (e.g., User F) also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user (e.g., User F) in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

Figure 3A:
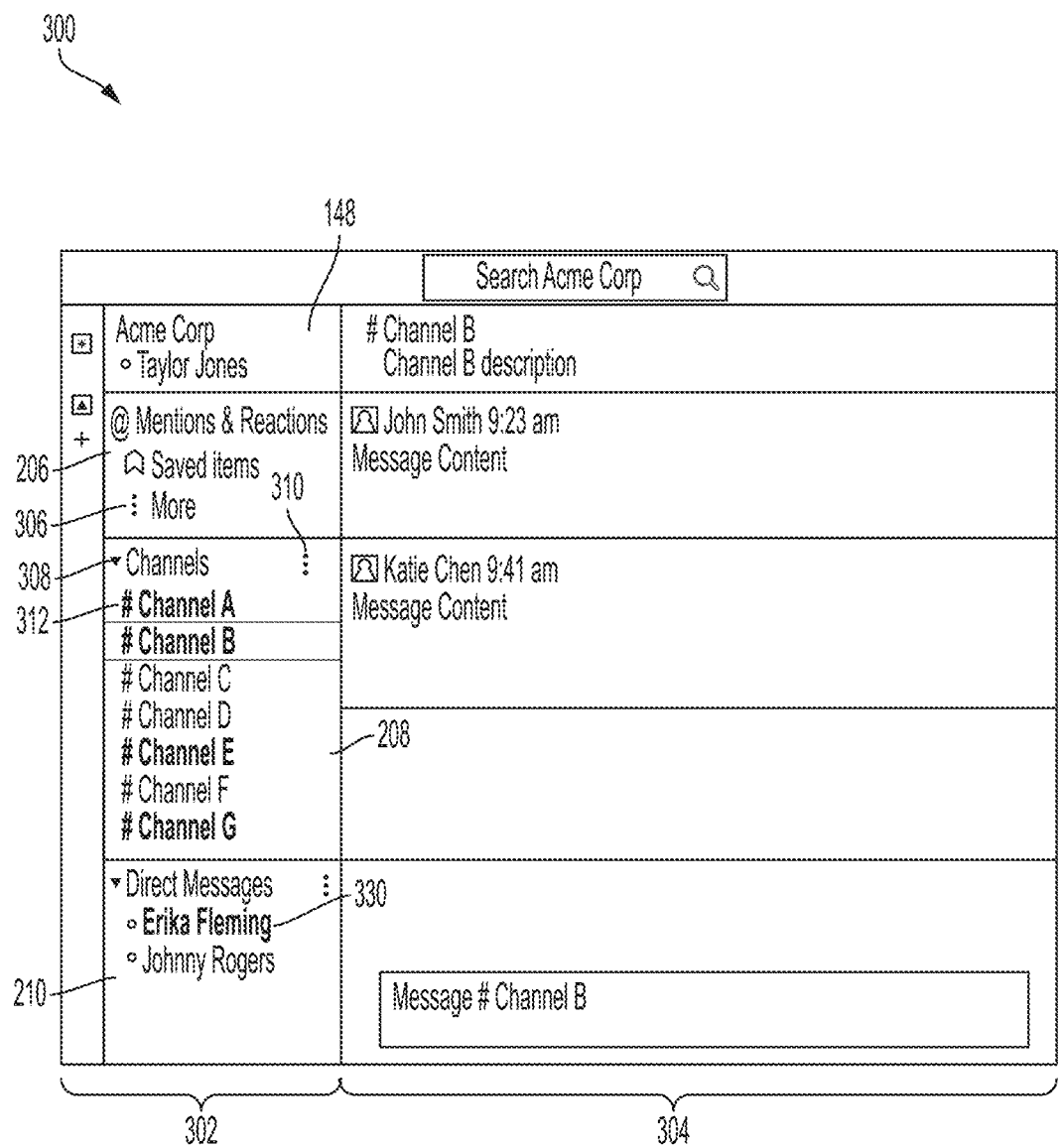
FIGS. 3A-3C illustrate an exemplary user interface of a group-based communication system for allowing a user to view and/or respond to a message, according to some embodiments.
Figure 3B:
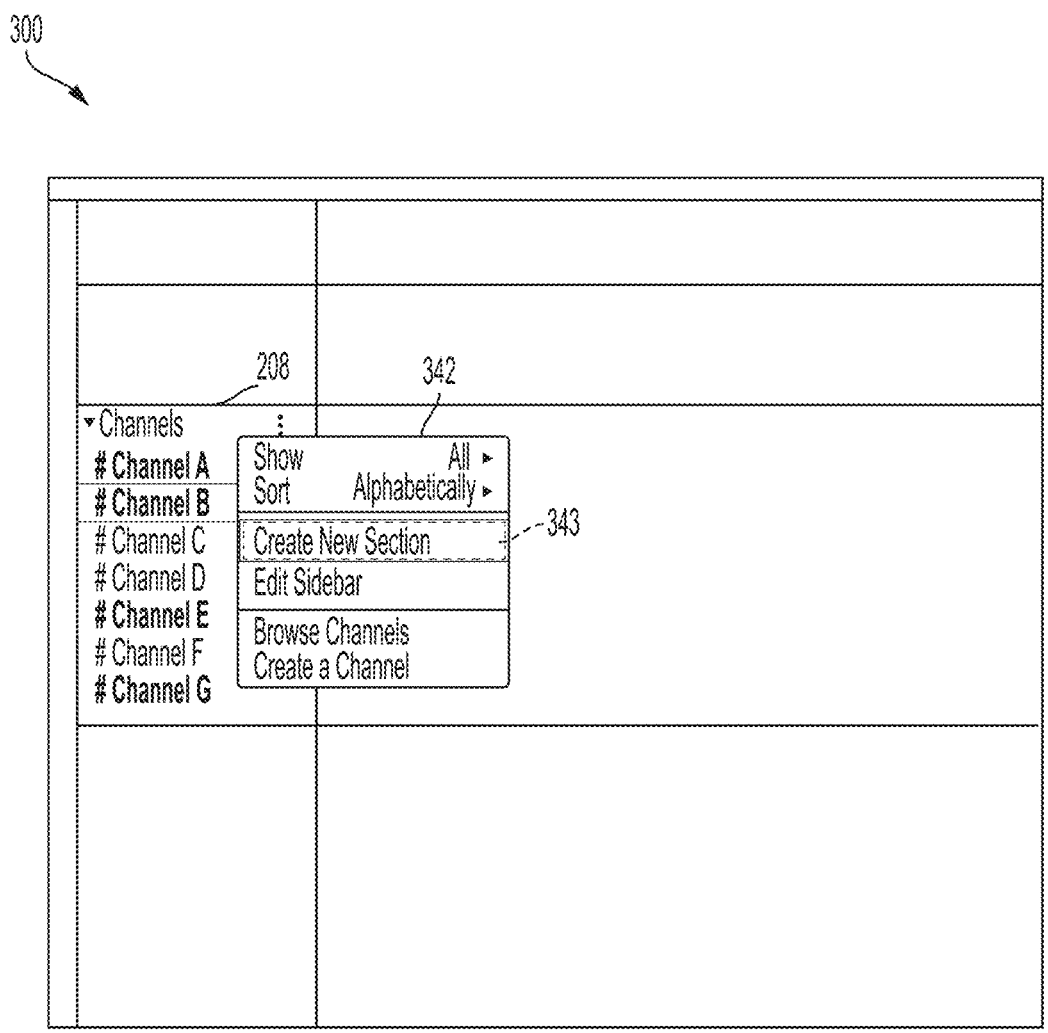
Figure 3C:
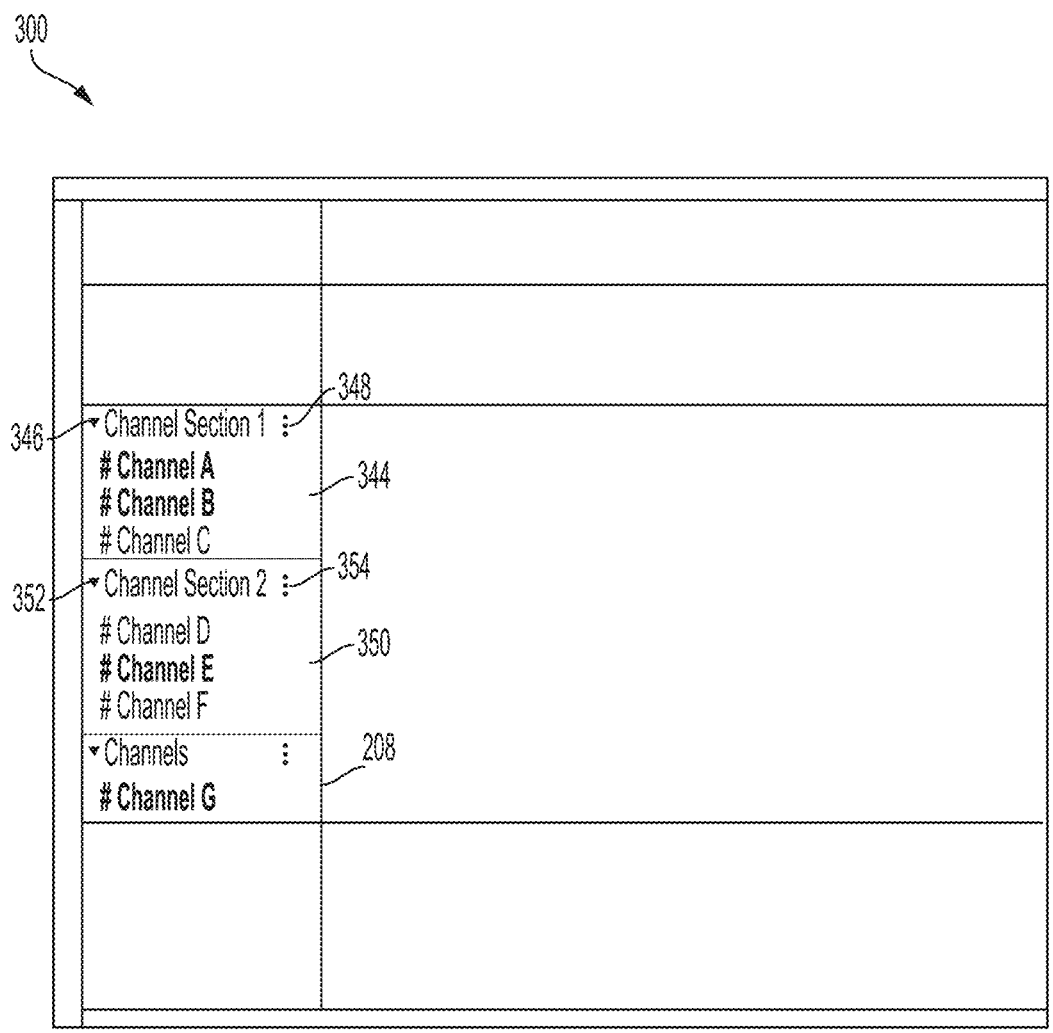

FIGS. 3A-3C illustrate an exemplary user interface 300 of a group-based communication platform for allowing a user to view messages associated with different message groups, such as different communication channels and different direct message communications. User interface 300 can include any of the features discussed above with respect to interface 144 and the discussion of those features is not repeated for brevity.

In some embodiments, interface 300 includes a sidebar display region 302 that can include a plurality of message group indicators associated with different message groups, such as different communication channels (e.g., indicator 312 associated with Channel A) and different direct messages (e.g., indicator 330 associated with "Erika Fleming"). A user can select a message group indicator in the sidebar display region 302 to display messages associated with the corresponding message group in a message display region 304.

The display of the message groups in sidebar display region 302 may be customized according to a user-defined sorting scheme. In some embodiments, the user can group message groups into sections, reorder the sections, and/or reorder messages groups within the section. Thus, the message groups can be grouped and ordered according to the user's preferences. Ordering the message groups based on a user's preferences can be advantageous in enable a user to display those message groups (e.g., communication channels, direct message conversations, etc.) that are most important to the user at the top of sidebar display region 302, and to reduce the amount of time that the user would otherwise need to spend searching for more important messages.

As depicted in FIG. 3A, the message groups are divided into two sections: sub-section 208 for communication channels and sub-section 210 for direct messages, as discussed above with respect to interface 144 of FIG. 2. In the illustrated example, the sub-section 208 is displayed above the sub-section 210 and the communication channels and direct message conversations are arranged alphabetically. In some embodiments, this may represent a default or predefined ordering of message groups. As explained further below with respect to FIGS. 3B and 3C, the message groups (e.g., communication channels and direct messages) may be re-sorted by the user resulting in a user-defined sorting scheme for the message groups. In some embodiments, user-defined sorting can include creating new message group sections and moving messages groups across sections, defining ordering of message groups within sections, and/or ordering sections according to user preferences.

FIGS. 3B and 3C illustrate grouping communication channels into new channel sections, according to some embodiments. According to some embodiments, upon a user input to select user affordance 310 (see, FIG. 3A), menu 342 may be displayed for providing options for customizing display of the channels within sub-section 208.

In some embodiments, menu 342 may include a plurality of user affordances to modify the communication channels displayed (e.g., by adding a communication channel, removing a communication channel, hiding a communication channel from view, and/or modifying the order in which communication channels are displayed). Menu 342 may include the option to "Create New Section," as depicted in region 343 of FIG. 3B. Upon selecting (e.g., via a mouse hover or a press of the mouse) "Create New Section," a user may be able to organize the communication channels displayed in sub-section 208 into a plurality of user-defined sections by dividing sub-section 208. Upon selecting region 343 to create a new section, region 343 may be distinguished from other user affordances (e.g., by bolding and/or highlighting region 343).

In some embodiments, menu 342 may be displayed such that it overlaps a portion of sub-section 208 in which the communication channel indicators are displayed and/or message display region 304 in which messages are displayed. In some embodiments, menu 342 may be displayed such that it appears in front of other content on the interface, therefore blocking the other content from being viewed.

FIG. 3C illustrates two new channel sections—a first channel section 344 and a second channel section 350. Each new section includes a set of channels previously in sub-section 208. Sub-section 208 now includes a single channel.

First channel section 344 may be displayed above second channel section 350, which in turn may be displayed above sub-section 208. However, the order of channel sections and sub-section 208 may be customized according to a user's preference (e.g., channel sections can be reordered according to a pre-defined criteria, or in response to the user manually dragging entire channel sections). When a channel section is moved, the corresponding set of channels included in the channel section moves with the channel section; for example, if first channel section 344 were moved such that it is displayed beneath second channel section 350, first channel section 344 would still include Channel A, Channel B, and Channel C. Although shown to include two channel sections, interface 300 may include three or more channel sections. In some embodiments, each channel section may be customized by selecting one or more user affordances (e.g., triangle 346 and/or vertical ellipse 348 associated with first channel section 344, and triangle 352 and/or vertical ellipse 354 associated with second channel section 350) to modify the content displayed in the channel section.

Thus, FIGS. 3A-3C demonstrate that a plurality of message groups (e.g., communication channels, direct message conversations, etc.) associated with a communication platform may be reorganized according to a user's preferences. Such reorganization may be important at least to enable a user to display those communication channels that are most important to the user at the top of sidebar display region 302, and to reduce the amount of time that the user would otherwise need to spend searching for important communication channels and/or important messages associated with important communication channels.

In some embodiments, a user may define a sorting scheme to designate an order in which communication channels should be ordered within a channel section and the order of channel sections. As discussed above, enabling a user to order communication channels according to his or her preference may allow the user to display an indicator for an important communication channel above an indicator for a less important communication channel. A user may be able to more easily access messages associated with a first communication channel displayed above a second communication channel. By organizing communication channels such that more important channels are displayed above less important channels, a user may be able to better organize his or her thoughts, and/or to view and/or respond to important messages quicker.

In some embodiments, a user-defined sorting scheme may include a combination of user customization and pre-defined sorting schemes. For example, a user may define channel sections (user customization) and channels within a section may be ordered according to a pre-defined sorting scheme (e.g., alphabetically). In some embodiments, a user may select a pre-defined sorting scheme from a plurality of pre-defined sorting scheme options; in these embodiments, customization may include both defining channel sections and selecting which sorting scheme option to use. Thus, the user-defined sorting scheme may be a combination of user customization and pre-defined sorting.

In some embodiments, a user may define a new sorting scheme. In some embodiments, a user may select a sorting scheme from a plurality of other types of methods to organize communication channels in a channel section (e.g., to hide the display of one or more communication channels, to move one or more communication channels to a different channel section and/or a new channel section, and/or to mute one or more communication channels).

Figure 4A:
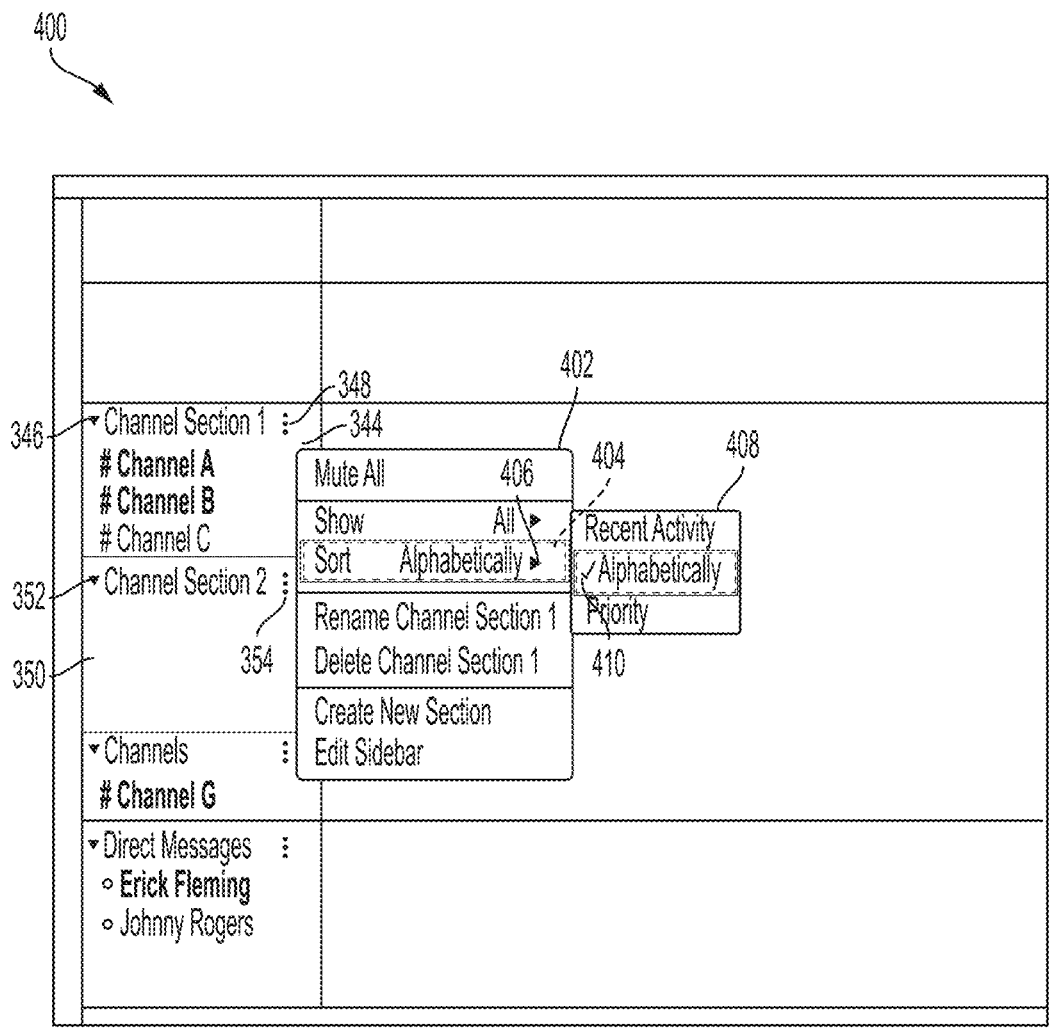
FIGS. 4A-4B illustrate aspects of a sidebar display region of an interface associated with a group-based communication platform, according to some embodiments.

FIG. 4A illustrates a method for modifying an order in which message groups are displayed within a given message group section, according to some embodiments. Interface 400 of FIG. 4A may include first channel section 344 and second channel section 350 in similar fashion to that described above with respect to FIG. 3C.

In some embodiments, in response to a user selecting user affordance 348 (e.g., by clicking on the vertical ellipses) of first channel section 344, menu 402 may be displayed so that a user may modify the content displayed in channel section 344. In some embodiments, menu 402 comprises a plurality of options for modifying the content displayed in first channel section 344.

Menu 402 may include an option to "Sort" a plurality of communication channels associated with Channel Section 1. As depicted in menu 402, a first user input may indicate that a user would like to select an option to sort and/or organize the communication channels (e.g., via a mouse hover over or a mouse click on region 404 in which "Sort" is displayed) from a plurality of options for modifying the content displayed in first channel section 344. In some embodiments, in response to the first input to sort the communication channels, the order in which the communication channels are displayed in channel section 344 may be re-ordered according to a sorting method. In some embodiments, a default and/or predefined sorting setting (e.g., sort alphabetically) may be automatically selected in response to the first input, and the communication channels associated with channel section 344 may be reordered according to the default and/or predefined sorting setting. In some embodiments, in response to the first input to sort the communication channels, region 404 corresponding to the sort option may be distinguished (e.g., by bolding and/or highlighting region 404) from other regions of menu 402 which are associated with other options to modify the display of channel section 344.

In some embodiments, menu 402 may be displayed such that it overlaps a portion of first channel section 344, second channel section 350, and/or message display region 304. In some embodiments, menu 402 may be displayed such that it appears in front of other content on the interface, therefore blocking the other content from being viewed.

In some embodiments, a second user input may indicate that a user would like to specify how to sort the communication channels (e.g., via a mouse hover over or a press of the mouse on) user affordance 406, which may be any suitable shape, such as a triangle pointing to the right, as shown, for indicating to the user that more information can be displayed and/or detecting a user input. In some embodiments, in response to the second user input to specify how to sort the communication channels, menu 408 may be displayed. In some embodiments, menu 408 may instead be displayed automatically in response to the first user input. In some embodiments, menu 408 may be displayed adjacent to (e.g., to the right of) menu 402. In some embodiments, menu 408 comprises one or more options for sorting the communication channels such that they appear in a specific order. For example, as shown, menu 408 may include an option to sort by "Recent activity" (e.g., to sort by time such that a first message that was received before a second message appears above the second message, or vice versa), to sort "Alphabetically" (e.g., such that a first message that begins with an "a" appears above a second message that begins with a "b," or vice versa, and/or to sort by "Priority" (e.g., by employing a machine learning process that relies on a feature vector list based on how often a user views a communication channel, how often a user sends messages in a communication channel, a frequency of messages in a communication channel, a number of participants in a communication channel, and/or a closeness of participants in a communication channel to calculate a priority score).

In some embodiments, a third user input (e.g., a mouse click on a region of menu 408 in which "Alphabetically" is shown) may indicate that a user would like to select a sorting option displayed within menu 408. In some embodiments, in response to the third input, the order in which the communication channels are displayed in channel section 344 may be re-ordered according to the selected sorting method. For example, if the communication channels associated with Channel Section 1 were not ordered such that Channel A is displayed above Channel B, which in turn is displayed above Channel C, then the communication channels may be re-ordered to match this display configuration. In some embodiments, in response to the third user input, a selection indicator (e.g., check-mark 410 which indicates that sorting method "Alphabetically" was selected) may be displayed.

Figure 4B:
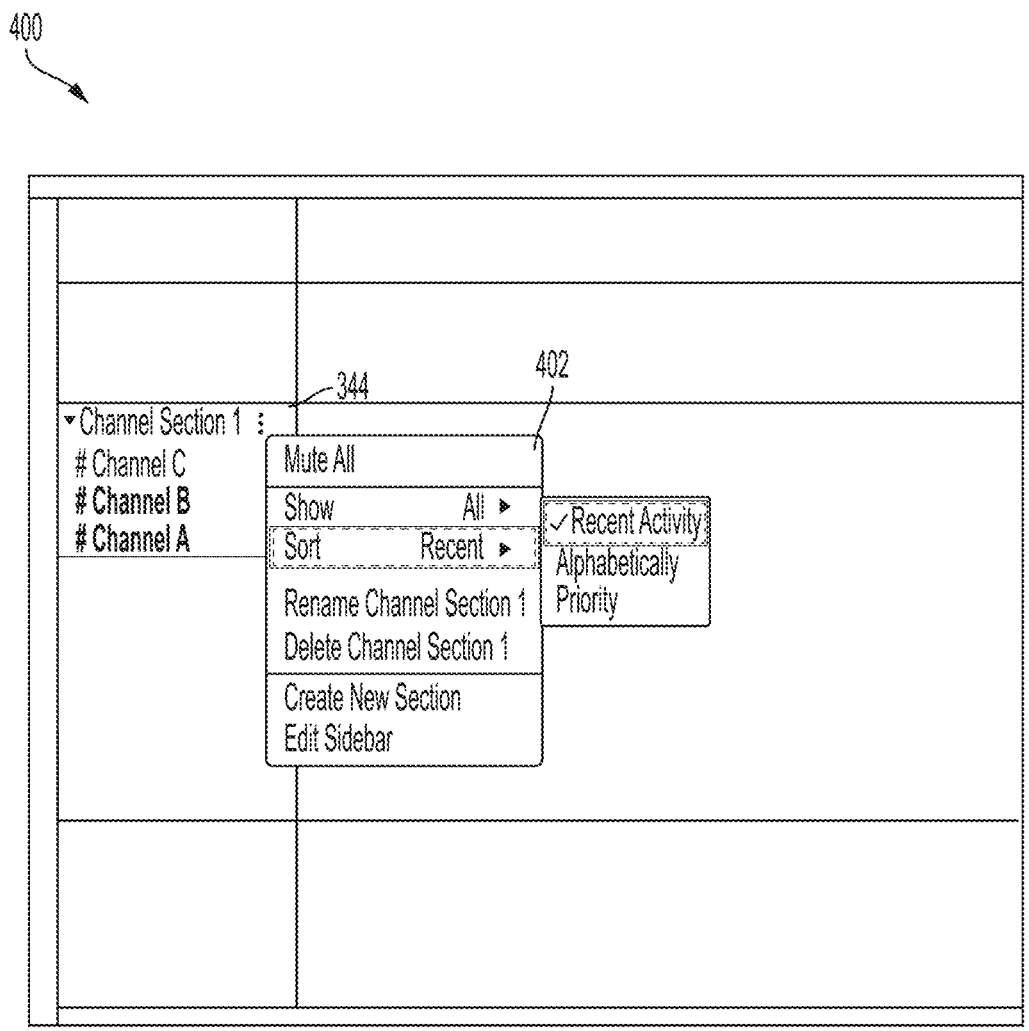

FIG. 4B depicts a modified version of menu 402 in channels within channel section 344 have been reordered by the user. In some embodiments, a user may select this different sorting setting by selecting "Recent activity" in menu 402. In some embodiments, in response, the order in which the communication channels are displayed in channel section 344 is re-ordered according to the newly selected sorting method. For example, the channels are ordered according to a most recent message having been received in Channel C; a second-most recent message having been received in Channel B; and a third-most recent message was received in Channel A. Thus, a user may easily switch between multiple sorting methods to organize communication channels within a channel section; this may be advantageous at least to provide increased flexibility over the order in which communication channels are displayed.

Various other message group customizations may be available. For example, as depicted in menu 402, in some embodiments, a user may select to move (e.g., to a previously defined channel section, to a new channel section, and/or to a region in which communication channels are displayed separately from a defined channel section), leave, mute, and/or delete a communication channel (e.g., if the user is an owner of the communication channel and/or has permission to perform any of these actions).

In some embodiments, if a communication channel is muted, it may be displayed at the bottom of the communication channel section, regardless of the sorting method used. For example, if Channel C of FIG. 4B is muted, even if Channel C would otherwise be displayed above Channel A and Channel B based on the sorting method used, Channel C will be displayed at the bottom of Channel Section 1, below both Channel A and Channel B. In some embodiments, the communication channel may easily be unmuted in response to an additional user input to unmute the communication channel (e.g., by clicking on the communication channel after it has been muted). In some embodiments, a user may select to mute all communication channels associated with the channel section (as depicted by the "Mute all" option in menu 402); in some embodiments, the order in which channels are displayed will not change in response to muting all channels in a channel section, but rather muting all channels in a channel section may ensure that no messages associated with the channel section may be displayed in message display region 304. In some embodiments, a user may delete the channel section and/or one or more (or all) communication channels associated with the channel section.

As explained in FIGS. 4A-4B, a user can flexibly customize an order in which communication channels appear in sidebar display region 302 to best meet his or her priority preferences. Moreover, the customized order in which content is displayed in sidebar display region 302 may define a user-defined sorting scheme for ordering display of the plurality of communication channels in the communication platform.

According to some embodiments, a user may desire to view unread messages for a plurality of communication channels, such as all communication channels or a set of communication channels. Accordingly, as discussed below with respect to FIG. 5A-C, a user may request to view unread messages and the user's unread messages (e.g., all unread messages or unread messages for a selected subset of channels) may be displayed. As explained with respect to FIGS. 3A-3C and 4A-4B, a user may customize the order in which communication channels are displayed in a sidebar display region of an interface according to a user-defined sorting scheme. Accordingly, the unread messages can be displayed according to the same user-defined sorting scheme. Thus, the usability benefits associated with the user's sorting scheme for the communication channels can be ported over to the display of unread messages.

Figure 5A:
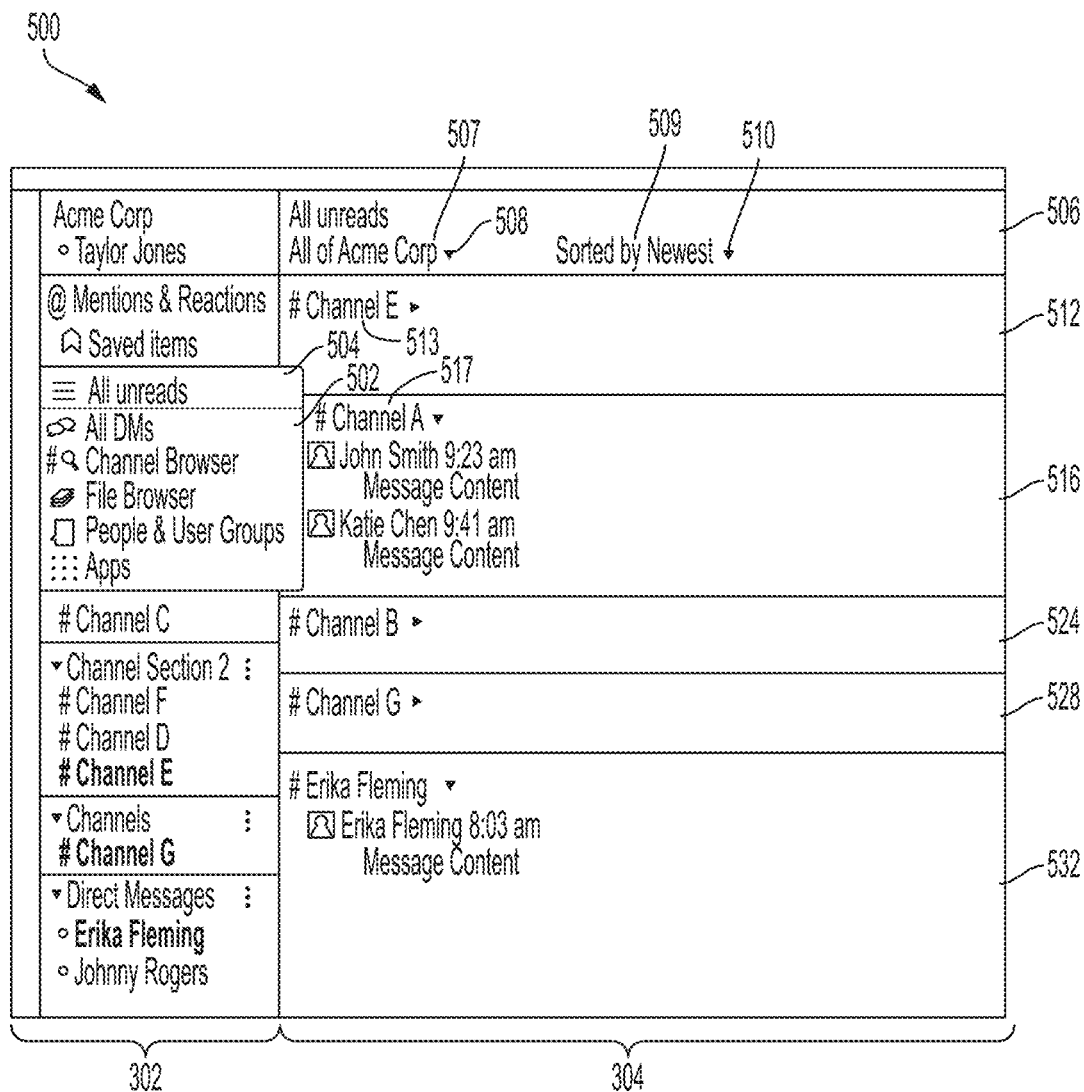
FIGS. 5A-5C illustrate aspects of a message display region of an interface associated with a group-based communication platform, according to some embodiments.
Figure 5B:
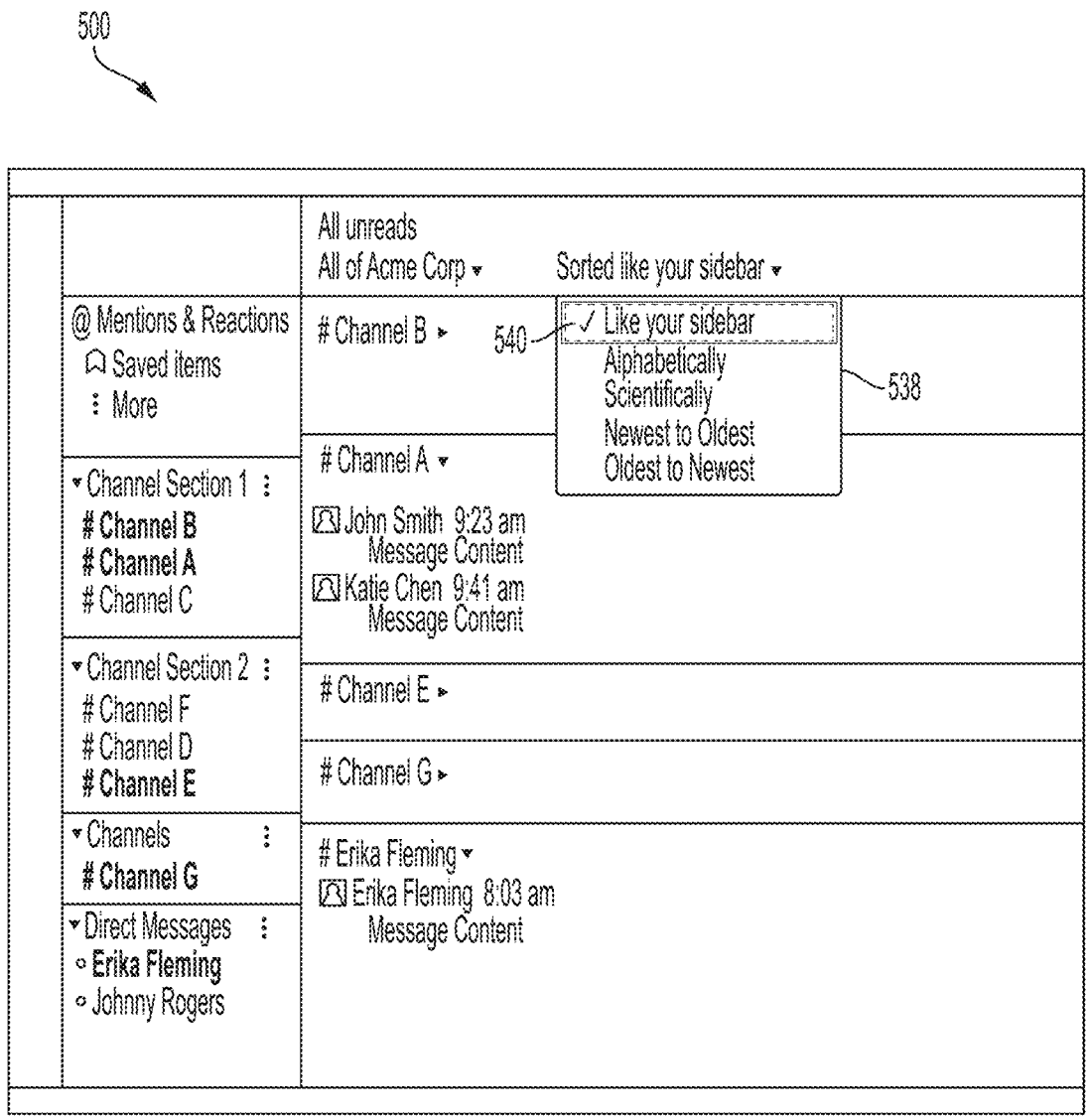
Figure 5C:
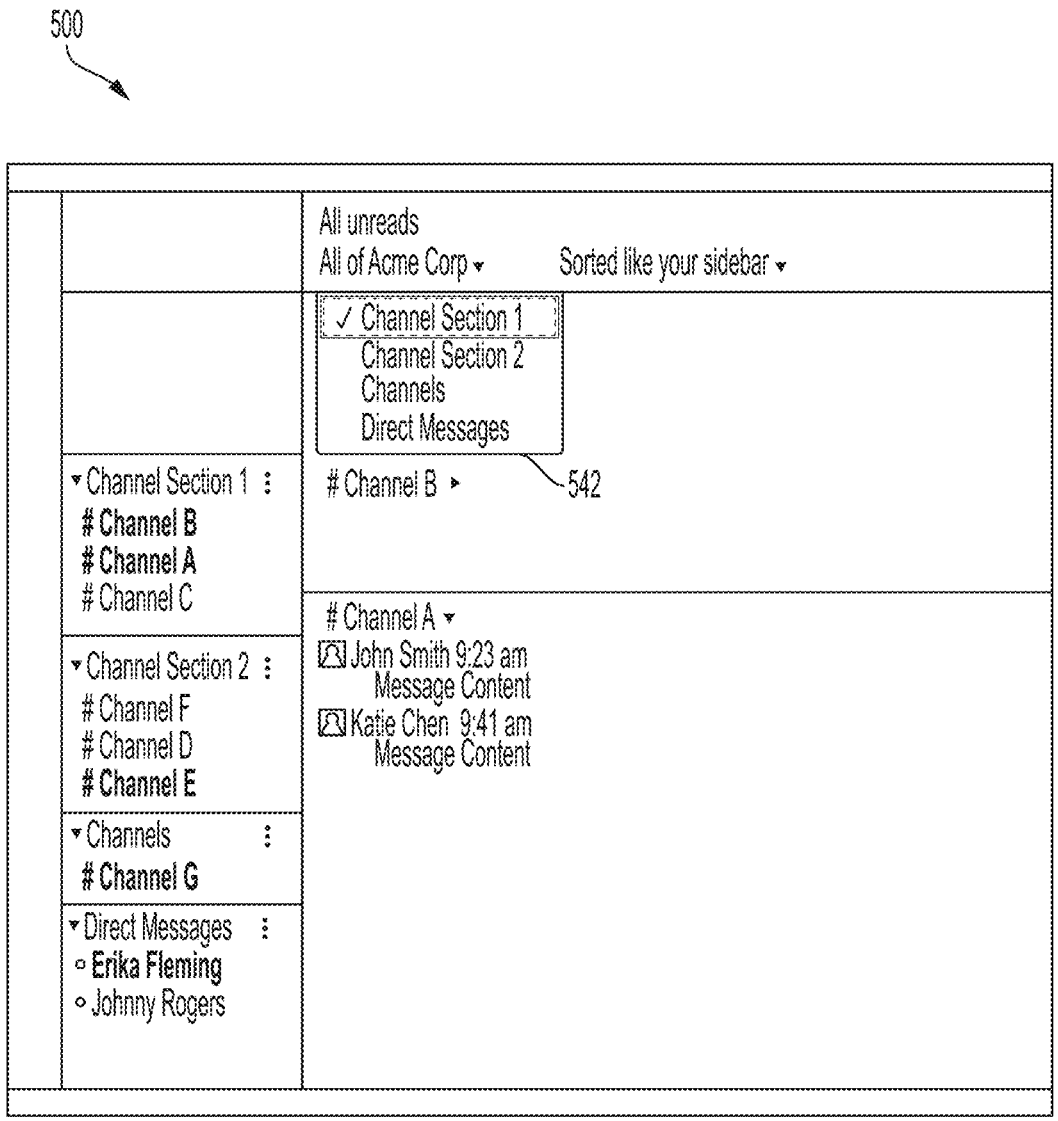

FIGS. 5A-C illustrate display of unread messages according to a user-defined sorting scheme, according to various embodiments. FIG. 5A illustrates a user requesting display of unread messages, according to some embodiments. Interface 500 of FIG. 5A includes a sidebar display region 302 for displaying message groups (e.g., communication channels, direct message conversations), as discussed above with regards to FIG. 3A. A user may request to view unread messages, such as via menu 502, which may be displayed in response to a user selection (e.g., via a mouse hover or a mouse click) of a user affordance (e.g., user affordance 306 of FIG. 3A, which may be any suitable shape for indicating to the user that more information can be displayed and/or detecting a user input). In some embodiments, menu 502 includes an option to display "All unreads," or all data that has not been read (e.g., viewed) by the user, as discussed above with regards to FIG. 2.

In some embodiments, in response to the user input selection of "All unreads" region 504, unread messages associated with at least a portion of the message groups (e.g., communication channels and/or direct message conversations) may be displayed, such as in message display region 304 of interface 500. In some embodiments, the unread messages may be displayed in a default and/or predefined order (e.g., such that the newest messages are displayed first). The default and/or predefined setting may be to display and/or organize the unread messages by workspace, time, type of action, type of message, communication channel, direct message user, or the like, as discussed above with regards to FIG. 2. As depicted in FIG. 5A, a plurality of message display regions 512, 516, 524, 528, and 532 are organized and displayed by message group (e.g., so that messages associated with Channel A are grouped together and displayed in a separate region from those associated with Channel B, which are grouped together and displayed in a separate region from those associated with a direct message with another user, such as "Erika Fleming").

In some embodiments, the default and/or predefined order in which unread messages are displayed may be viewed in header region 506. In some embodiments, indicator 509 may indicate to the user to a type of organization and/or sorting method used to display the unread messages in message display region 304. For example, as depicted, indicator 509 shows that the sort method used is to "Sort by Newest" (e.g., such that an unread message received most recently is displayed above an unread message received earlier). In some embodiments, user affordance 510 may be associated with the indicated sorting method and may be selected (e.g., via a mouse hover or a mouse click) to indicate that a user would like to display unread messages according to a different sorting method, as will be explained further in regard to FIG. 5B.

As shown in FIG. 5A, unread messages may appear in an order that is different than the order that the communication channels are displayed in the sidebar display region 302. For example, messages associated with Channel E are displayed in message display region 512, and messages associated with Channel A are displayed in message display region 516. However, as shown in FIG. 5B, Channel A is displayed above Channel E in the sidebar, while message display region 516 associated with Channel A is displayed below message display region 512 in the message display region. This may lead to inefficiencies and/or confusion if a user wants to view and/or respond to important messages. Thus, a user may desire to display unread messages according to the user-defined sorting scheme used to order content in a sidebar display region. In some embodiments, a user may select to order unread messages according to the user-defined sorting scheme.

In some embodiments, a user may additionally be able to view channel sections associated with displayed unread messages. For example, as depicted, indicator 507 may indicate to the user that an entire workspace, including all channel sections, is currently displayed. In some embodiments, user affordance 508 may be associated with the indicated channel section(s) and may be selected (e.g., via a mouse hover or a mouse click) to indicate that a user would like to display unread messages according to a different set of communication channel sections, as will be explained further in regard to FIG. 5C.

In some embodiments, if a communication channel is not associated with any unread messages, no message region is displayed for that communication channel (e.g., no message region is depicted in FIG. 5A for Channel F). In some embodiments, if a communication channel has been muted, no message region is displayed for that communication channel (no messages would be received for that communication channel, as previously explained).

In some embodiments, a first indicator may be displayed to indicate to the user which workspace, communication channel, message group section, and/or direct message user a given unread message or set of unread messages is associated with (e.g., indicator 513 may indicate to the user that message display region 512 is associated with Channel E and indicator 517 may indicate to the user that message region 516 is associated with Channel A). In some embodiments, unread messages for a message group may be hidden and only the indicator for the message group may be displayed.

As noted above, with respect to FIG. 5A, unread messages may be displayed (e.g., in message display region 304) according to a predefined sorting scheme (e.g., Sorted by Newest). However, predefined sorting schemes may not reflect the user's organization scheme for the respective message groups and, therefore, may make navigation of unread messages cumbersome and/or inefficient. Accordingly, a user may select to apply the same organization scheme applied to the message groups, as discussed above with respect to FIG. 3A-4B, to the display of the unread messages, as discussed further below.

Turning to FIG. 5B, a user may select for unread messages to be displayed according to the user-defined sorting scheme for the message groups via menu 538, which may include an option to sort message display region 304 such that unread messages are displayed "Like your sidebar" (e.g., in an order which matches an order in which communication channels have been ordered in the sidebar). As depicted, the option to display unread messages in the same order in which communication channels are displayed may be selected from a plurality of options for modifying the order in which unread messages are displayed in message display region 304. In some embodiments, in response to the user input to sort unread messages "Like [the] sidebar," region 540 corresponding to the sort option may be distinguished (e.g., by adding a check mark) from other regions of menu 538 to indicate to the user that the "Like your sidebar" option has been selected.

In some embodiments, in response to the user input to select the "Like your sidebar" sorting option, the order in which unread messages are displayed in message display region 304 may be modified according to the user-defined sorting scheme to sort the communication channels. For example, as depicted in FIG. 5B, those unread messages associated with Channel B may be displayed above those unread messages associated with Channel A, which may in turn be displayed above those unread messages associated with Channel E, which matches the order in which the communication channels are displayed in sidebar display region 302. Thus, the unread messages are displayed in an order that matches a user-defined sorting scheme for ordering display of a plurality of message groups in the communication platform.

In some embodiments, the unread messages are displayed according to the user-defined sorting scheme by calling a function to sort the unread messages and passing a "sort-by-sidebar" key into the function. In some embodiments, the key may be different depending on the sorting method selected (e.g., the key may be "alphabetical" if "Alphabetically" is selected in menu 538). In some embodiments, after the "sort-by-sidebar" key is passed into the function, a structure associated with the order in which content (e.g., communication channels) is displayed in sidebar display region 302 may be selected, and the structure associated with the order in which the content is displayed in sidebar display region 302 may be mapped to a structure associated with the order in which content is displayed in message display region 304.

In some embodiments, a user may indicate that the user would like to display unread messages according to a different set (e.g., a subset) of message group sections. In some embodiments, displaying unread messages associated with only a subset of message group sections, as opposed to all unread messages, may be advantageous at least to reduce clutter and/or unnecessary distractions caused when a user simultaneously views too many unread messages, especially if a plurality of the unread messages displayed are important. Thus, by filtering to modify which unread messages are displayed at a given time, a user may be able to view and/or respond to important unread messages quicker, more comprehensively, and/or more accurately.

In some embodiments, in response to a user input to select user affordance 508 of FIG. 5A, menu 542 of FIG. 5C may be displayed to modify the communication channel sections from which unread messages are displayed. In some embodiments, menu 542 may include an option to display only those unread messages associated with one channel section, for example Channel Section 1. As depicted, the option to display only those unread messages associated with Channel Section 1 may be selected from a plurality of options for modifying the message source(s) from which unread messages are displayed.

In some embodiments, in response to a user input to select "Channel Section 1," the unread messages displayed in message display region 304 may be modified. For example, as depicted in FIG. 5C, only unread messages associated with Channel B and Channel A (and not unread messages associated with Channel E, Channel G, or Erika Fleming) are displayed. In some embodiments, a user may quickly and easily be able to modify the unread messages displayed in message display region 304 by modifying the selection made in menu 542.

In some embodiments, a user may be able to select a plurality of options included in menu 542, thus simultaneously displaying unread messages associated with a plurality of communication channel sections (e.g., a user may select to display unread messages associated with Channel Section 1 and Channel Section 2). Selecting a plurality of message sources may be advantageous if important messages are associated with some, but not all, message sources. In some embodiments, a user may be able to select (e.g., simultaneously) all options included in menu 542.

According to various embodiments, when selecting to view unreads of a subset of message group sections, the display of the message groups of the selected subset reflects the user-defined sorting scheme. For example, as shown in FIG. 5C, with Channel Section 1, Channel B is shown above Channel A the message display region just like they are shown in the sidebar region.

Figure 6:
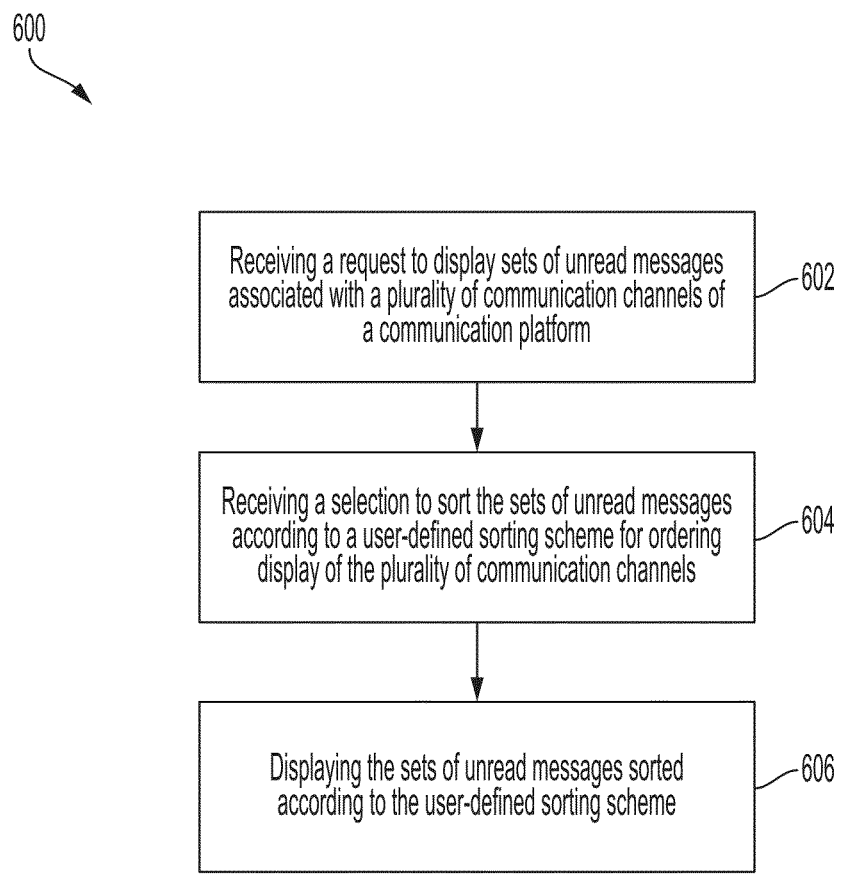
FIG. 6 illustrates a method for sorting a message display region of an interface associated with a group-based communication platform, according to some embodiments.

FIG. 6 illustrates a method 600 for sorting a message display region of an interface associated with a group-based communication platform, according to some embodiments. Method 600 may be performed by one or more portions of environment 100 of FIG. 1. In some embodiments, method 600 is performed at least partially on a user computing device, such as user computing device 104 of FIG. 1. In some embodiments, method 600 is performed by user computing device 104 in communication with one or more servers 102 of FIG. 1.

At step 602, a request is received to display sets of unread messages associated with a plurality of communication channels of a communication platform. For example, with reference to FIG. 5A, a user may select to view all unread messages by selecting "All unreads" in region 504 of menu 502. In some embodiments, one or more of the sets of unread messages are originated by a first user (e.g., "John Smith" of FIG. 3A). The one or more sets of unread messages may be received by one or more other users associated with the communication platform. In some embodiments, one of the other users associated with the communication platform may originate the request to display the one or more sets of unread messages (e.g., on a user computing device).

At step 604, a selection is received to sort the sets of unread messages according to a user-defined sorting scheme for ordering display of the plurality of communication channels. For example, with reference to FIG. 5B, a user may select to sort the sets of unread messages according to the user-defined sorting scheme by selecting "Like your sidebar" in menu 538. In some embodiments, the user may select "Like your sidebar" from a plurality of sorting schemes, such as those depicted in menu 538 of FIG. 5B.

At step 606, the sets of unread messages sorted according to the user-defined sorting scheme are displayed on a device associated with a user of the group-based communication platform. In some embodiments, the sets of unread messages are displayed within interface 144 of FIG. 2 or interface 500 of FIG. 5 on a user computing device 104 of a user associated with a group-based communication platform. In some embodiments, a selection may be received to display sets of unread messages for a selected section, and the sets of unread messages for the selected section sorted according to the user-defined sorting scheme may be displayed. For example, with reference to FIG. 5C, a user may select "Channel Section 1" in menu 542 to display the sets of unread messages associated with Channel Section 1.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A computer-implemented method comprising:
receiving a request to display sets of unread messages associated with a plurality of communication channels of a communication platform, wherein a set of unread messages is associated with a respective communication channel of the plurality of communication channels, and wherein a communication channel of the plurality of communication channels comprises a data route used to exchange data between user computing devices of a defined group of users granted access to the communication channel;
receiving a selection to sort the sets of unread messages according to a user-defined sorting scheme for ordering display of the plurality of communication channels and for ordering display of unread messages of the sets of unread messages associated with the plurality of communication channels in the communication platform; and displaying the unread messages of the sets of unread messages associated with the plurality of communication channels sorted according to the user-defined sorting scheme.

2. The method of claim 1, wherein the plurality of communication channels are organized into a plurality of sections, the user-defined sorting scheme comprises a user-defined order of the plurality of sections, and the sets of unread messages are displayed according to the user-defined order of the plurality of sections such that first sets of unread messages for communication channels of a first section of the plurality of sections are displayed above second sets of unread messages for communication channels of a second section of the plurality of sections.

3. The method of claim 2, further comprising receiving a second selection to display third sets of unread messages for a selected section and displaying the third sets of unread messages for the selected section sorted according to the user-defined sorting scheme for the selected section.

4. The method of claim 1, wherein displaying the unread messages of the sets of unread messages comprises displaying communication channel identifiers and grouping each set of unread messages with a corresponding communication channel identifier.

5. The method of claim 4, wherein additional communication channel identifiers associated with communication channels that do not have unread messages are not displayed in the display of the unread messages of the sets of unread messages.

6. The method of claim 1, wherein first unread messages associated with a first communication channel that has been muted are not included in the display of the unread messages of the sets of unread messages.

7. The method of claim 1, wherein the selection to sort the sets of unread messages according to the user-defined sorting scheme is made via a menu that comprises a plurality of sorting schemes.

8. A group-based communication system comprising one or more processors, memory, and one or more programs stored in the memory and configured to be executed by the one or more processors, wherein the one or more programs include instructions for:
receiving a request to display sets of unread messages associated with a plurality of communication channels of a communication platform, wherein a set of unread messages is associated with a respective communication channel of the plurality of communication channels, wherein a communication channel of the plurality of communication channels comprises a data route used to exchange data between user computing devices of a defined group of users granted access to the communication channel;
receiving a selection to sort the sets of unread messages according to a user-defined sorting scheme for ordering display of the plurality of communication channels and for ordering display of unread messages of the sets of unread messages associated with the plurality of communication channels in the communication platform; and
displaying the unread messages of the sets of unread messages associated with the plurality of communication channels sorted according to the user-defined sorting scheme.

9. The system of claim 8, wherein the plurality of communication channels are organized into a plurality of sections, the user-defined sorting scheme comprises a user-defined order of the plurality of sections, and the sets of unread messages are displayed according to the user-defined order of the plurality of sections such that first sets of unread messages for communication channels of a first section of the plurality of sections are displayed above second sets of unread messages for communication channels of a second section of the plurality of sections.

10. The system of claim 9, further comprising receiving a second selection to display third sets of unread messages for a selected section and displaying the third sets of unread messages for the selected section sorted according to the user-defined sorting scheme for the selected section.

11. The system of claim 8, wherein displaying the unread messages of the sets of unread messages comprises displaying communication channel identifiers and grouping each set of unread messages with a corresponding communication channel identifier.

12. The system of claim 11, wherein additional communication channel identifiers associated with communication channels that do not have unread messages are not displayed in the display of the unread messages of the sets of unread messages.

13. The system of claim 8, wherein first unread messages associated with a first communication channel that has been muted are not included in the display of the unread messages of the sets of unread messages.

14. The system of claim 8, wherein the selection to sort the sets of unread messages according to the user-defined sorting scheme is made via a menu that comprises a plurality of sorting schemes.

15. A non-transitory computer-readable storage medium storing one or more programs, the one or more programs comprising instructions, which when executed by one or more processors of a computing system, cause the computing system to:
receive a request to display sets of unread messages associated with a plurality of communication channels of a communication platform, wherein a set of unread messages is associated with a respective communication channel of the plurality of communication channels, wherein a communication channel of the plurality of communication channels comprises a data route used to exchange data between user computing devices of a defined group of users granted access to the communication channel;
receive a selection to sort the sets of unread messages according to a user-defined sorting scheme for ordering display of the plurality of communication channels and for ordering display of unread messages of the sets of unread messages associated with the plurality of communication channels in the communication platform; and
display the unread messages of the sets of unread messages associated with the plurality of communication channels sorted according to the user-defined sorting scheme.

* * * * *